US012526563B2

(12) United States Patent
Potron

(10) Patent No.: US 12,526,563 B2
(45) Date of Patent: Jan. 13, 2026

(54) DEVICE FOR PROCESSING A SIGNAL, AUDIO SYSTEM, LOUDSPEAKERS, ACOUSTIC RESONATOR, AND VEHICLE DOOR, EQUIPPED FOR SOUND, ASSOCIATED THEREWITH

(71) Applicant: FOCAL JMLAB, La Talaudiere (FR)

(72) Inventor: Alexis Potron, Saint-Etienne (FR)

(73) Assignee: FOCAL JMLAB, La Talaudiere (FR)

( * ) Notice: Subject to any disclaimer, the term of this patent is extended or adjusted under 35 U.S.C. 154(b) by 222 days.

(21) Appl. No.: 18/031,280

(22) PCT Filed: Oct. 12, 2021

(86) PCT No.: PCT/FR2021/051771

§ 371 (c)(1),
(2) Date: Apr. 11, 2023

(87) PCT Pub. No.: WO2022/079384

PCT Pub. Date: Apr. 21, 2022

(65) Prior Publication Data

US 2023/0388684 A1 Nov. 30, 2023

(30) Foreign Application Priority Data

Oct. 12, 2020 (FR) ....................................... 2010426

(51) Int. Cl.
*H04R 1/02* (2006.01)
*H04R 1/28* (2006.01)
(Continued)

(52) U.S. Cl.
CPC ........... *H04R 1/025* (2013.01); *H04R 1/2811* (2013.01); *H04R 3/02* (2013.01); *H04R 29/001* (2013.01); *H04R 2499/13* (2013.01)

(58) Field of Classification Search
CPC ........ H04R 1/025; H04R 1/2811; H04R 3/02; H04R 29/001; H04R 2499/13
See application file for complete search history.

(56) References Cited

U.S. PATENT DOCUMENTS 10,104,473 B2 10/2018 Bjork et al.
2017/0019732 A1 1/2017 Mendes et al.
(Continued)

FOREIGN PATENT DOCUMENTS

EP 3637792 A1 4/2020

OTHER PUBLICATIONS

ISA/EPO International Search Report and Written Opinion for corresponding International Application No. PCT/FR2021/051771 dated Oct. 12, 2021 (15 pages).

*Primary Examiner* — Andrew Sniezek
(74) *Attorney, Agent, or Firm* — Harris Beach Murtha Cullina PLLC

(57) ABSTRACT

A device for processing an input signal for a loudspeaker is disclosed. The device includes a processing line with modules for estimating expected loudspeaker movements and generating an adaptive control signal by solving coupled differential equations representing both the loudspeaker and its acoustic environment. At least one transmission line provides a non-adaptive control signal from the input signal. An adder combines the adaptive and non-adaptive control signals to form the output signal. The device may use real-time feedback of loudspeaker parameters, such as voltage and current, to update the model dynamically. This approach reduces sound distortion while preserving user control over volume, making it especially suitable for compact or acoustically constrained environments, such as vehicle doors. The invention further relates to audio sys-
(Continued)

tems, loudspeakers, acoustic resonators, and vehicle doors incorporating such processing devices.

2 Claims, 10 Drawing Sheets

(51) Int. Cl.
*H04R 3/02* (2006.01)
*H04R 29/00* (2006.01)

(56) References Cited

U.S. PATENT DOCUMENTS

| | | | | |
|---|---|---|---|---|
| 2018/0014121 | A1 | 1/2018 | Lawrence et al. | |
| 2020/0099355 | A1 | 3/2020 | Nielsen et al. | |
| 2020/0404420 | A1* | 12/2020 | Malsky .................... | H04R 1/24 |

* cited by examiner

[Fig1]
PRIOR ART
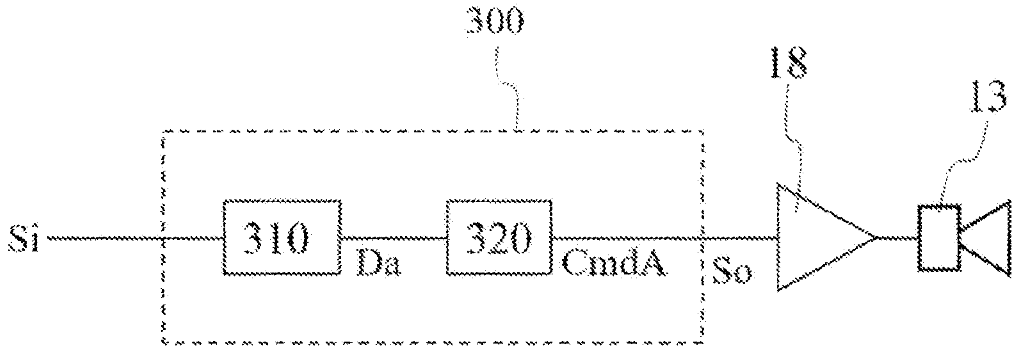
[Fig2]
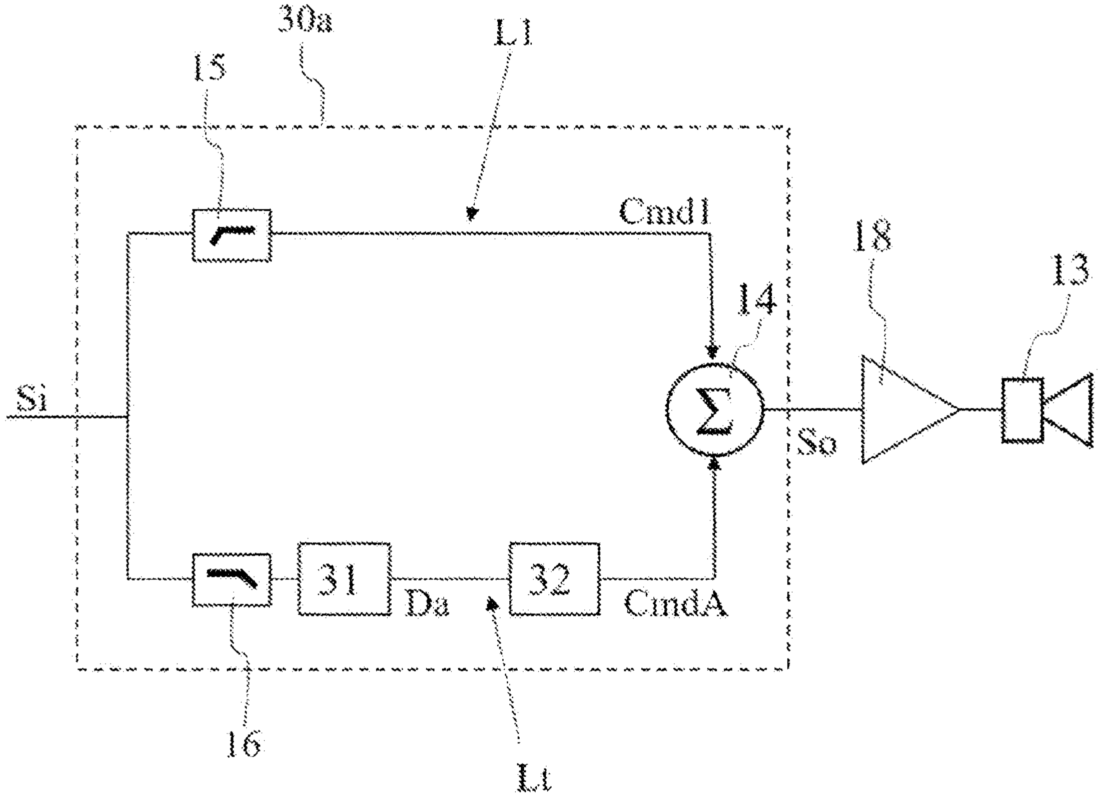

[Fig3]
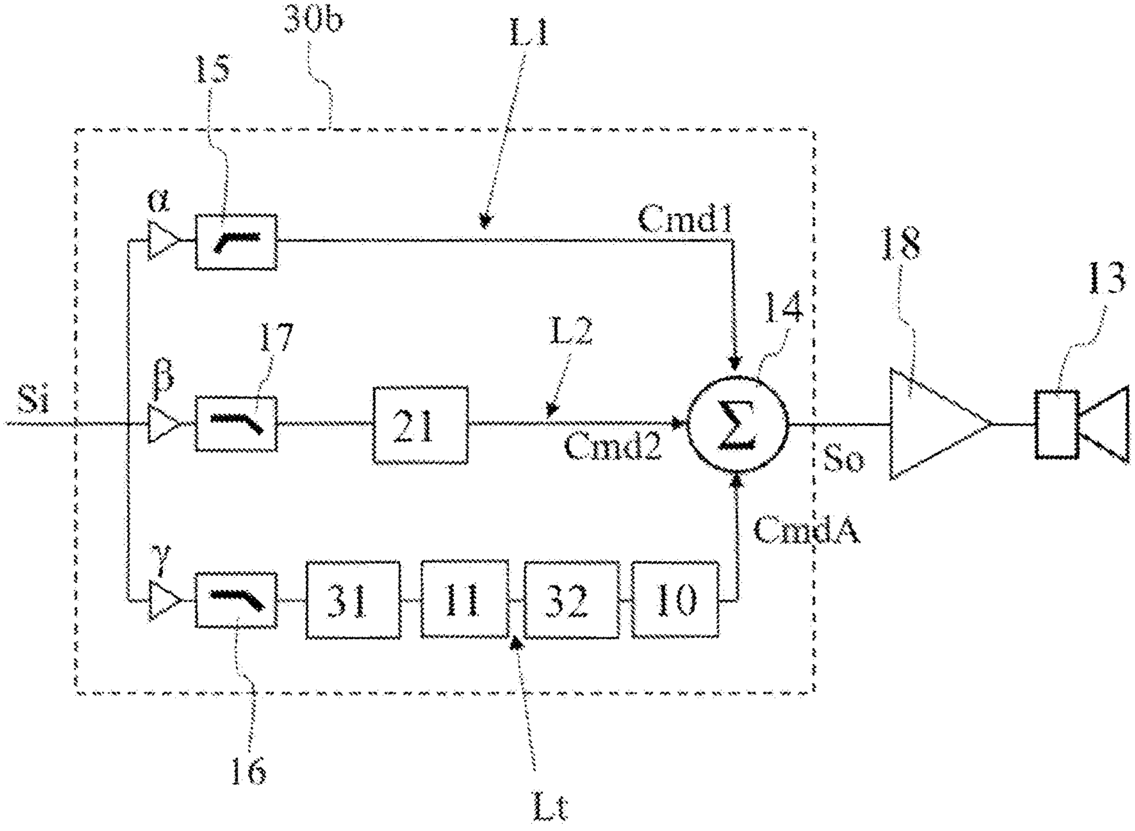

[Fig4]
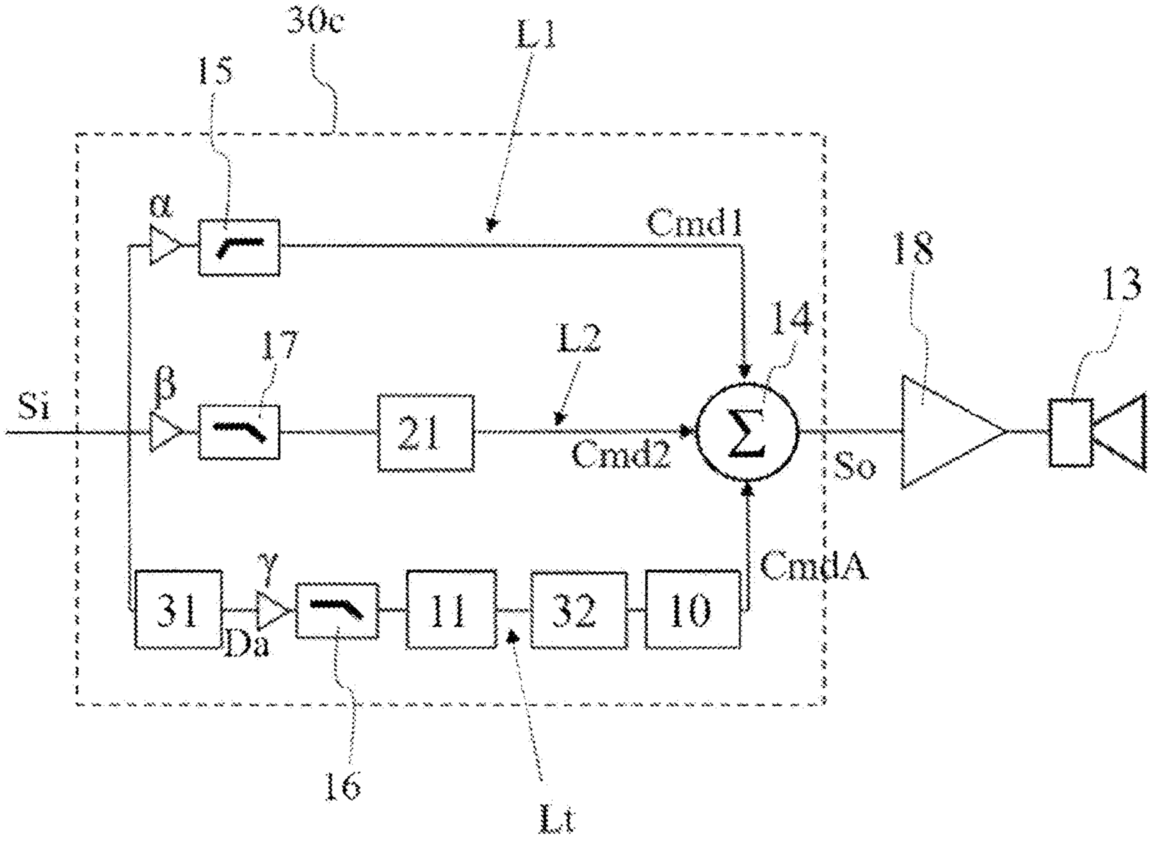

[Fig5]
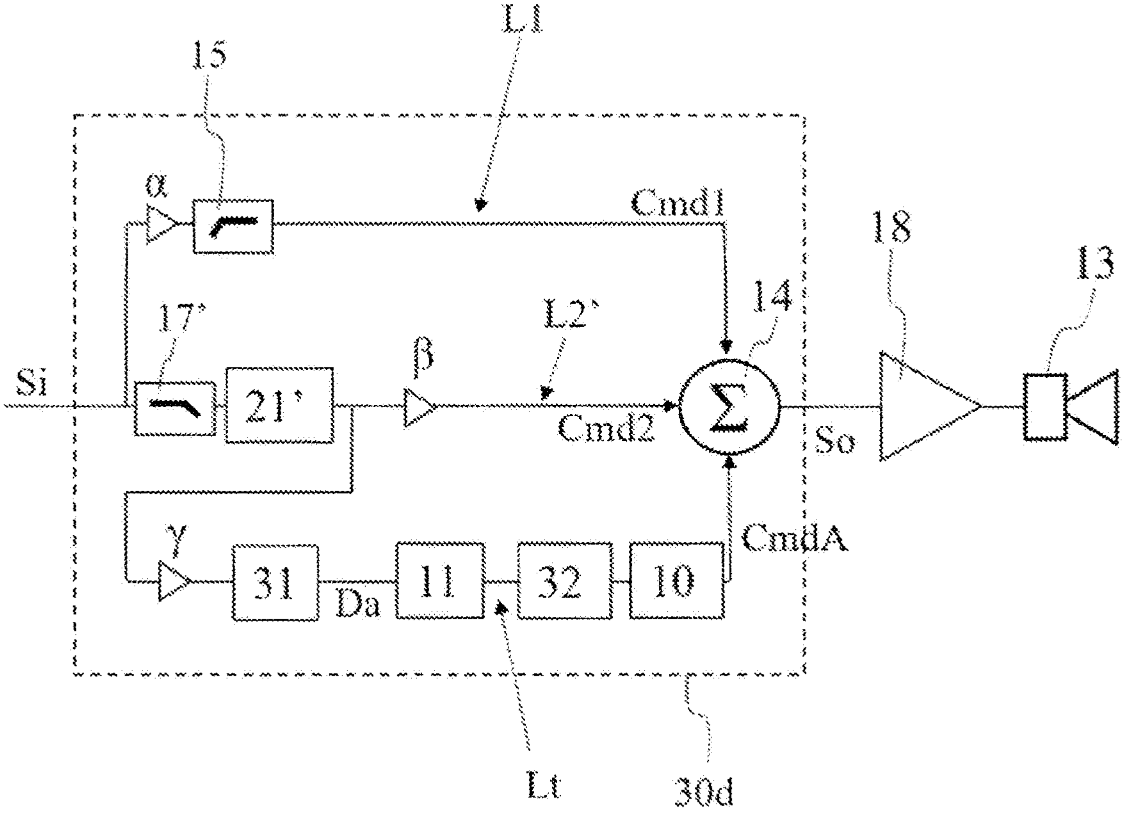

[Fig6]
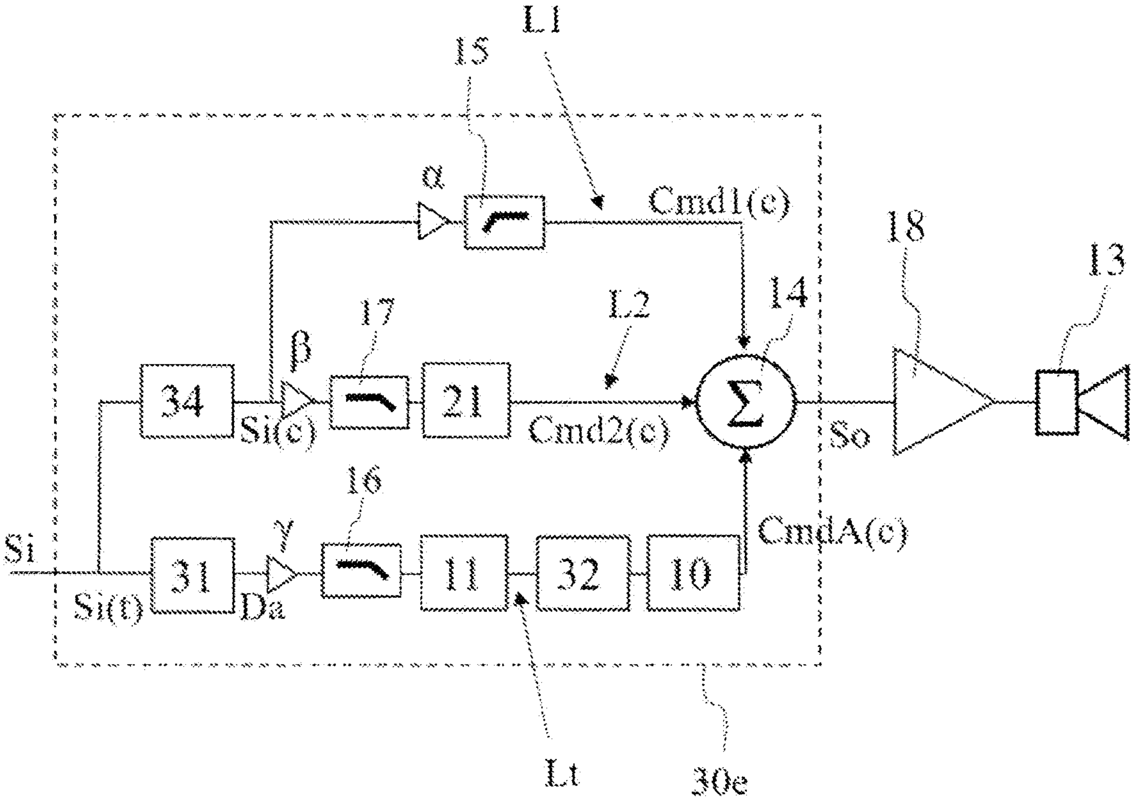

[Fig7]
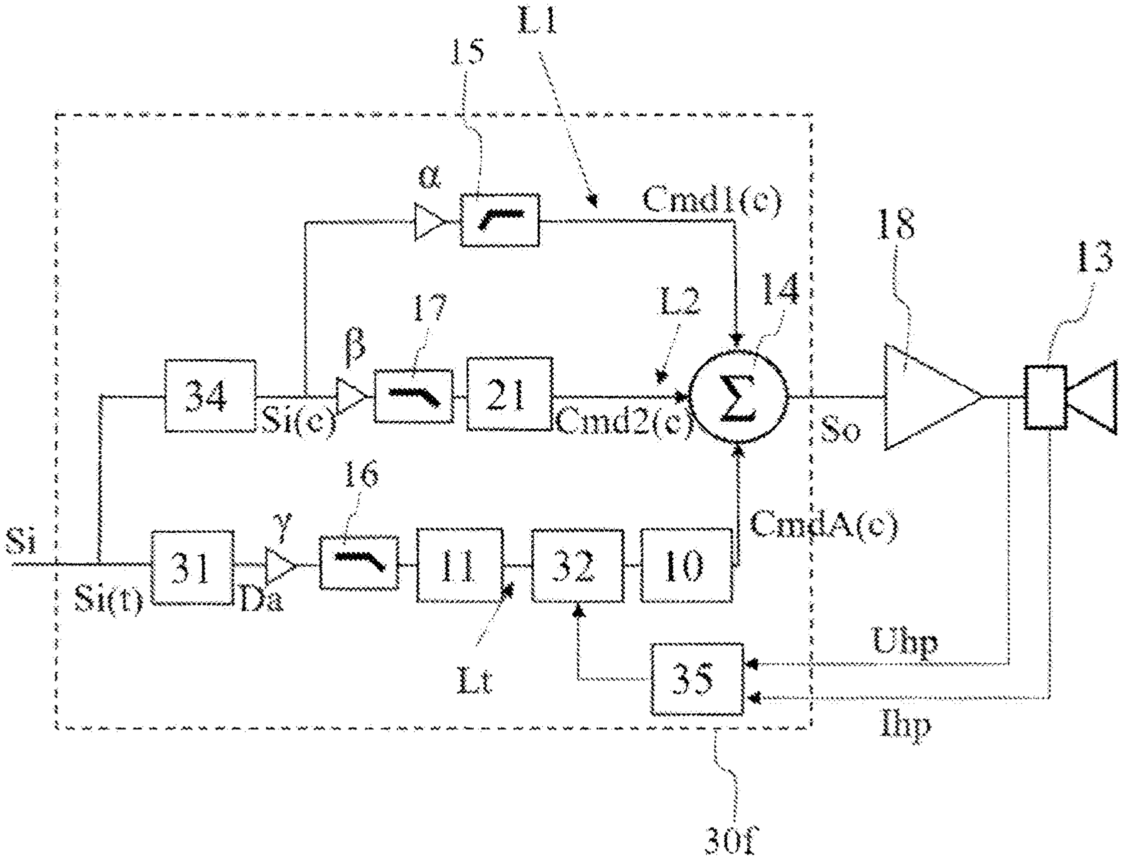
[Fig8]
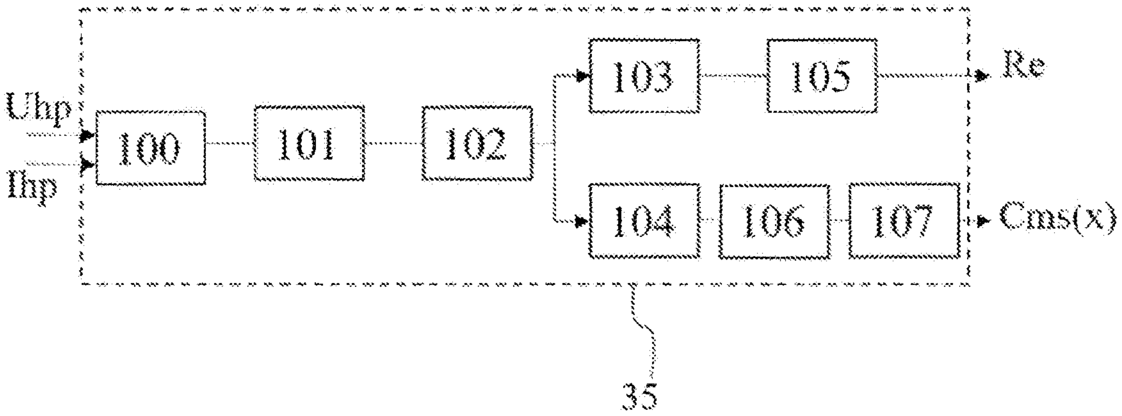

[Fig9]
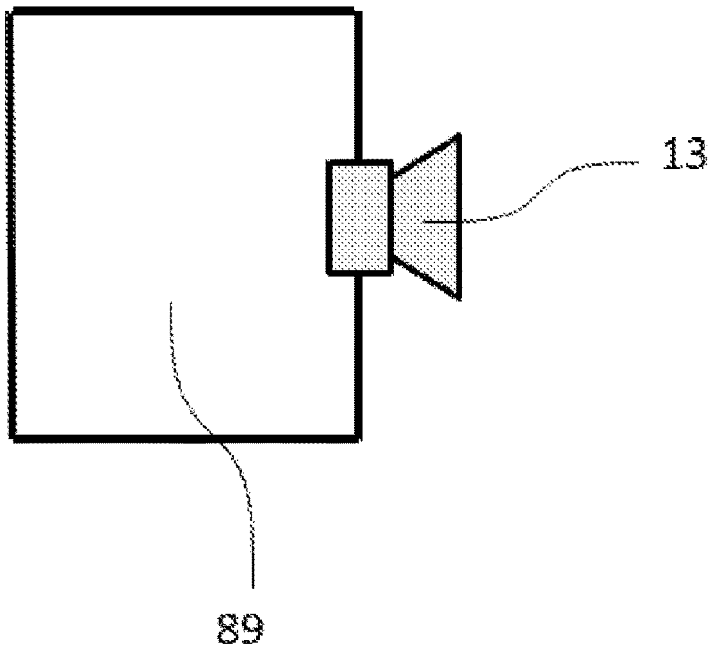
[Fig10]
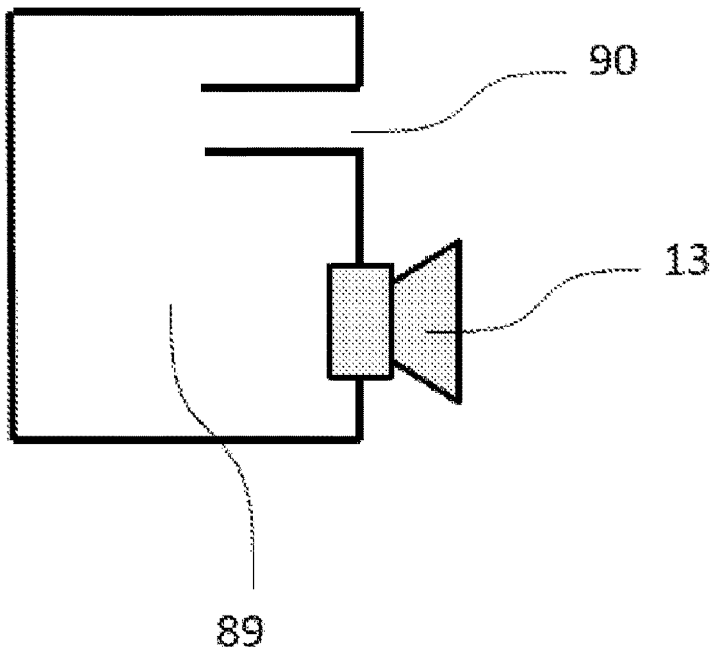

[Fig11]
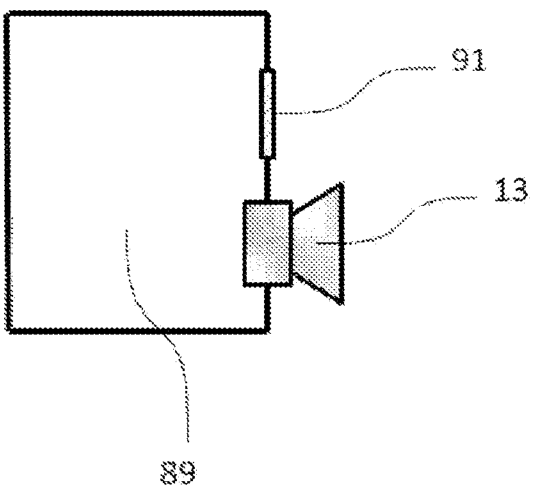
[Fig12]
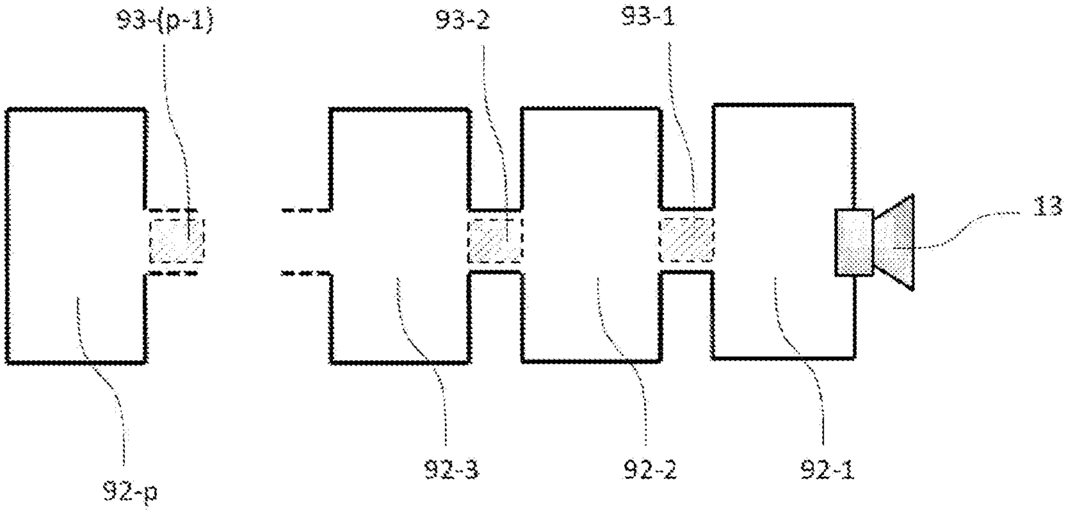

[Fig13]
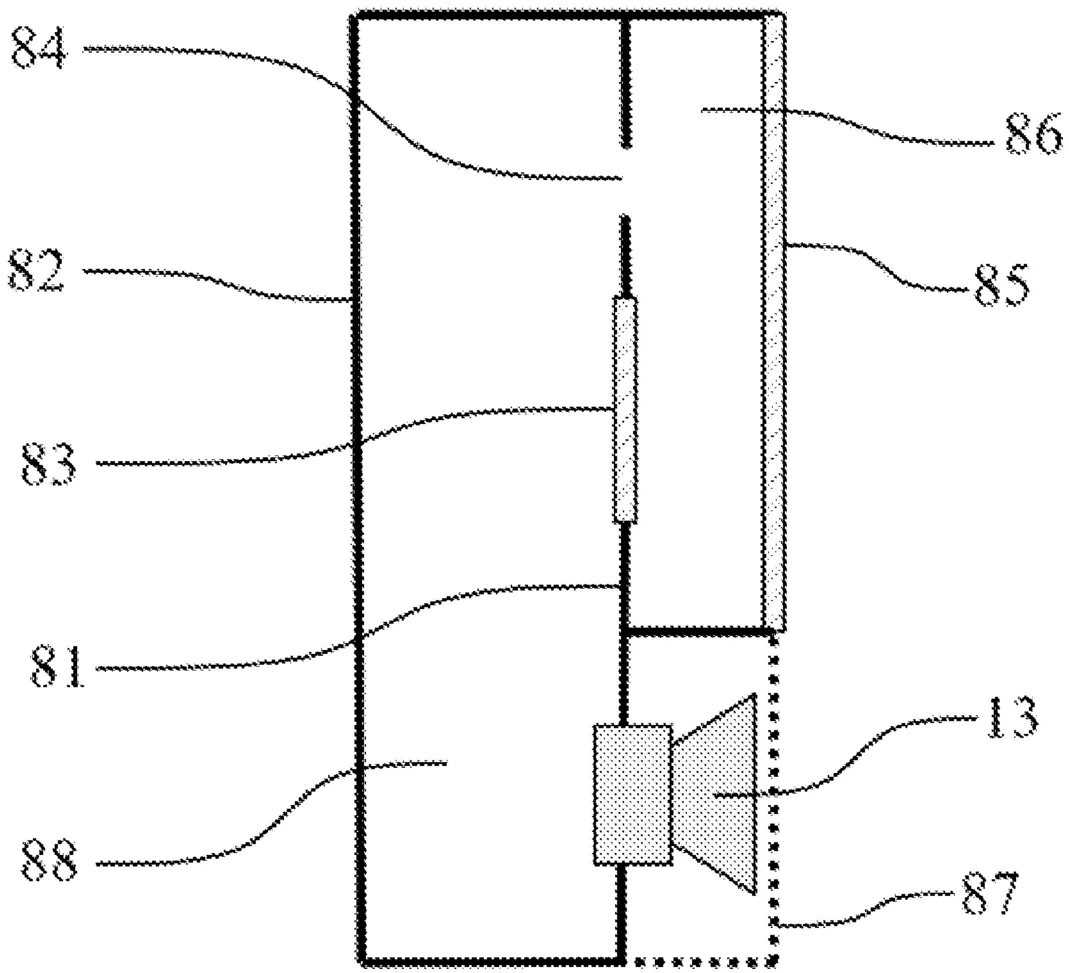

[Fig14]
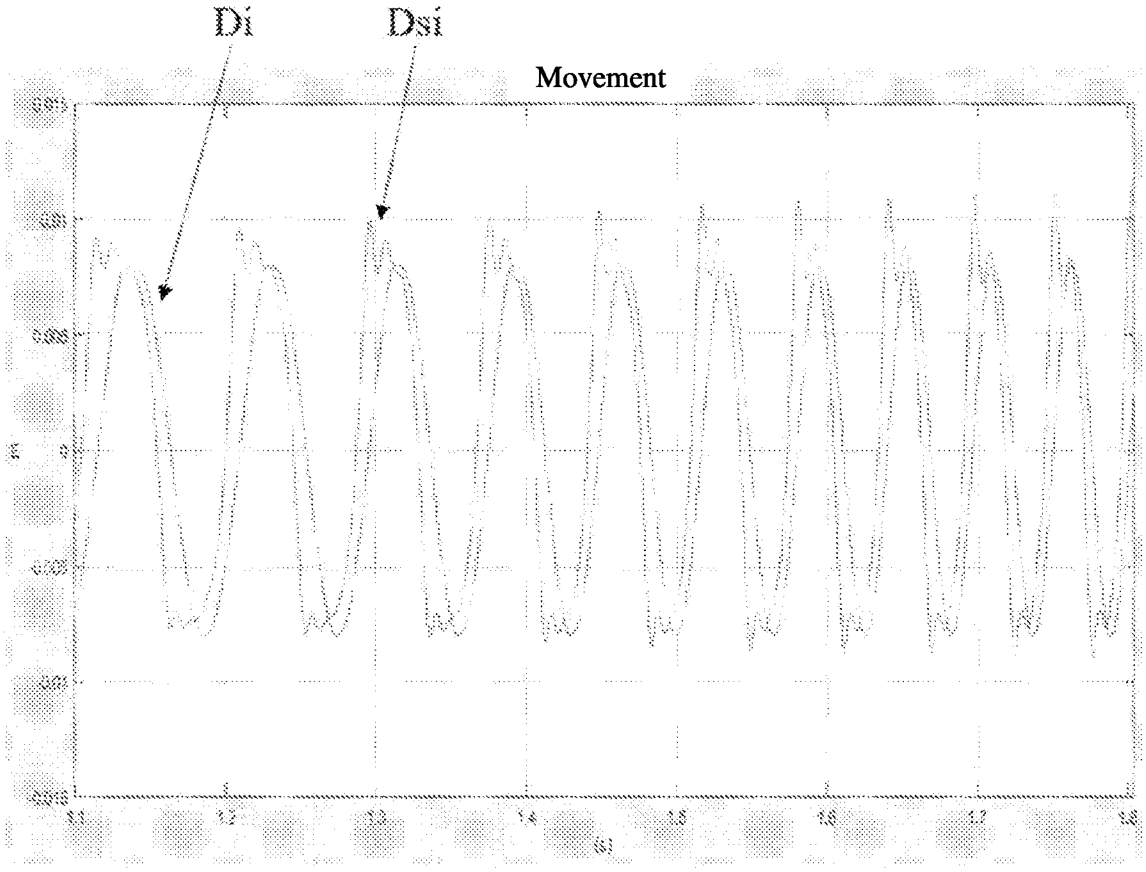

DEVICE FOR PROCESSING A SIGNAL, AUDIO SYSTEM, LOUDSPEAKERS, ACOUSTIC RESONATOR, AND VEHICLE DOOR, EQUIPPED FOR SOUND, ASSOCIATED THEREWITH

CROSS-REFERENCE TO RELATED APPLICATIONS

This application is a national stage application under 35. U.S.C. § 371 of PCT Application No PCT/FR2021/051771, filed on Oct. 10, 2021, which claims priority to, and the benefit of French Application No. 2010426 filed on Oct. 12, 2020, which are incorporated herein by reference in their entirety.

TECHNICAL FIELD

The invention relates to the field of sound processing devices, i.e., devices generating an analog or digital output signal, intended to be fed to a loudspeaker from an analog or digital input signal.

In particular, the invention relates to a device for processing an analog or digital signal making it possible to limit the nonlinearities of the loudspeaker with which it is associated. More precisely, the invention advantageously makes it possible to reduce the sound distortions of the loudspeaker while maintaining a high amplitude of sound intensity.

The invention integrates the acoustic load seen by the loudspeaker and has a multitude of applications, including the use of the loudspeaker in simple or complex acoustic enclosures and resonators. For example, a particularly advantageous application of the invention is for the sound system of a vehicle door requiring ever smaller and lighter loudspeakers.

PRIOR ART

By definition, a loudspeaker is a device that makes it possible to transform an electrical signal into acoustic waves. To do this, the motor of a loudspeaker is conventionally made up of a permanent magnet and a coil, moving inside the field of the magnet. The electrical signal present at the loudspeaker terminals is converted into an electrical current which travels through the coil. Under the effect of this current, the coil is set in motion and transmits this driving force to a membrane which in turn generates a compression wave in the air which surrounds it.

In a linear regime, for a given frequency, the acceleration of the coil is proportional to the current flowing through it. However, the greater the intensity of the current flowing through the coil, the more the loudspeaker has nonlinearities leading to potentially audible distortions of the sound produced by the loudspeaker.

In particular, the nonlinearities may come from the lack of uniformity of the magnetic field in which the coil is immersed. Indeed, the greater the intensity of the current flowing through the coil, the higher the amplitude of its displacement, going so far as to partially exit the zone where the magnetic field of the magnet is uniform.

The nonlinearities may also come from the mechanical suspensions of the loudspeaker. Indeed, the stiffness of these suspensions does not remain constant for high amplitudes of displacement.

The nonlinearities may also come from the acoustic load of the loudspeaker and be due, for example, to the presence of vibrations or acoustic short-circuits at the acoustic load seen by the loudspeaker.

It is possible to delay the appearance of these nonlinearities by increasing the dimensions of the loudspeaker. However, there is a real need for miniaturization of loudspeakers to add sound systems to ever lighter and more compact surfaces. In particular, in order to meet the need of car manufacturers to reduce the dimensions and weight of vehicles as much as possible to minimize fuel consumption, it is sought to integrate small-sized loudspeakers, i.e., loudspeakers whose membrane diameter is less than 10 cm. Therefore, a compromise is made between the sound quality and the space left available for the loudspeaker.

In addition, to obtain quality sound with a small-sized loudspeaker, it is known to limit the analog signal in frequency and/or in amplitude by means of filters or compressors and/or limiters. This solution has the effect of limiting the maximum sound level emitted by the loudspeaker.

There are also systems making it possible to act on the loudspeaker control analog signal to compensate for sound distortions related to loudspeaker nonlinearities. Such systems require determining the characteristics of the loudspeaker and its operating environment in order to create a mathematical model to estimate the distortions likely to appear on the loudspeaker as a function of the analog signal applied to the loudspeaker.

For example, document US 2017/0019732 discloses a processing device 300, shown schematically in FIG. 1 of the prior art. This processing device 300 receives an analog input signal Si and provides an analog output signal So to feed a loudspeaker 13 through an amplifier 18. The processing device 300 comprises an estimation module 310 of expected movements Da of the loudspeaker 13 membrane as a function of the analog input signal Si. From these expected movements Da, a module 320 determines the signal So to be transmitted to loudspeaker 13 to obtain the expected movements Da, taking into account the nonlinearities of the loudspeaker 13.

To do this, the module 320 uses a mathematical model taking into account the nonlinearities of a loudspeaker and making it possible to modify, in real time, the loudspeaker control analog signal in order to produce a sound with reduced distortions by limiting the frequency and/or the intensity of the analog signal only when the mathematical model indicates that distortions are likely to appear on the loudspeaker.

This control system effectively makes it possible to limit loudspeaker distortion and maintain sound volume as long as the electrical signals sent to the loudspeaker do not risk damaging it. In contrast, when the mathematical model detects a risk of electrical and/or mechanical damage to the loudspeaker, the electrical signal sent to the loudspeaker is restricted and has a high sound amplitude limit, beyond which the user can no longer increase the sound volume, even by applying a greater command.

The technical problem that the invention proposes to solve is to implement a loudspeaker control system making it possible to limit distortions while preserving greater freedom of control by the user.

SUMMARY OF THE INVENTION

To respond to this technical problem, the invention proposes to process only part of the input signal, using a module for estimating the expected movements and a module for determining the control signal to be applied to obtain movements close to the expected movements, and not to process the remaining part of the input signal.

To control the loudspeaker, the unprocessed part is added to the processed part to form the output signal.

Thus, if the determination module detects that the loudspeaker risks causing distortions for a given input signal, the portion of the signal flowing through the determination module will potentially be restricted, but the user can always increase the sound volume because at least a portion of the amplified signal will not be restricted.

Therefore, the invention makes it possible to increase the user's freedom of control because they will be able to benefit from a sound without distortion as long as they maintain the sound level below the limit imposed by the determination module, but they will also have the option of continuing to increase the sound level if they wish. To do this, however, the user will have to accept a higher risk of distortion because the signal will then come from the unprocessed portion of the signal.

In other words, according to a first aspect, the invention relates to a device for processing an input signal, generating an output signal designed to be fed, directly or indirectly, to a loudspeaker through an amplifier, said device having a processing line comprising:

- a module for estimating the expected movements of the loudspeaker as a function of the input signal; and
- a module for determining an adaptive control signal to be transmitted to the loudspeaker, i.e., a signal determined digitally from an expected displacement of the membrane.

The invention is characterized in that the processing device further comprises:

- at least one input signal transmission line delivering at least one non-adaptive control signal, i.e., a signal originating, directly or indirectly, from the input signal; and
- an adder delivering the output signal by summing the adaptive control signal and the at least one non-adaptive control signal.

The determination module is, for example, configured to solve a system of coupled differential equations aimed at determining the signal to be transmitted to the loudspeaker to obtain the expected displacement of the membrane, the system of coupled differential equations representing the loudspeaker, considered as nonlinear transducer, and the loudspeaker environment.

Within the meaning of the invention, a loudspeaker has characteristics and a geometry. The characteristics are physical quantities such as the mass of the mobile assembly, the mechanical resistance or the compliance of the loudspeaker suspensions. The geometry of the loudspeaker may correspond to the mechanical ribs, such as the radiating surface of its membrane. Depending on the characteristics and the geometry taken into account, the resulting equations may be linear or nonlinear.

The coupled differential equations are solved according to the expected movements of the membrane of the loudspeaker associated with the device of the invention. To do this, the estimation module determines the expected displacement of the membrane as a function of the input signal. As a very simplified example, if the input signal corresponds to a sinusoidal signal with a frequency of 440 Hz, the expected displacement of the membrane is sinusoidal, of the same frequency, and the expected sound signal created by the loudspeaker corresponds to the musical note "A", free from distortion. Depending on the desired amplitude of this sound response, the nonlinearities of the loudspeaker may degrade the quality of the sound response.

To limit this phenomenon, the resolution of the system of coupled differential equations aims to determine which real electrical signal must be transmitted to the loudspeaker to obtain the expected displacement of the membrane, and, therefore, the expected sound response.

This, the adaptive control signal is generated following the resolution of the system of coupled differential equations of the determination module. If the expected control signal is analog, this control signal is conventionally obtained by a digital/analog converter after a digital resolution of the system of coupled differential equations.

Preferably, the sampling frequency for generating the adaptive control signal is chosen as high as possible while remaining calibrated to the resolution speed of the coupled differential equations, so as to limit the distortions introduced by the digital/analog conversion.

In addition, in order to obtain an accurate modeling of the loudspeaker in its environment, the system of coupled differential equations preferably integrates parameters representing the loudspeaker, considered as a nonlinear transducer, and the parameters of the loudspeaker environment, typically its acoustic load. To take into account the nonlinear parameters of the loudspeaker, the system of coupled differential equations preferably integrates the geometric definition and the linear and nonlinear characteristics of the loudspeaker. To take into account the parameters of the loudspeaker environment, the system of coupled differential equations preferably integrates the geometric definition and the characteristics of the environment, optionally estimated from hypotheses on the variations of air flow at the loudspeaker and in its environment.

In a first example, the loudspeaker is integrated into an acoustic enclosure comprising a rear box. The determination module may then be configured to solve a system of coupled differential equations representing:

- the geometric definition and characteristics of the loudspeaker; and
- the dimensions of the box.

Typically, the loudspeaker may include a box whose volume is closed, the box being then mounted at the rear of a loudspeaker so as to form its acoustic load.

In a second example, the loudspeaker is integrated into an acoustic enclosure comprising a rear box and at least one vent. The determination module may then be configured to solve a system of coupled differential equations representing:

- the geometric definition and characteristics of the loudspeaker;
- the dimensions of the box; and
- the characteristics of at least one vent.

In a third example, the loudspeaker is integrated into an acoustic enclosure comprising a rear box and at least one radiator. The determination module may then be configured to solve a system of coupled differential equations representing:

- the geometric definition and characteristics of the loudspeaker;
- the dimensions of the box; and
- the characteristics of at least one radiator.

In a fourth example, the loudspeaker is integrated into an acoustic resonator comprising at least two boxes communicating through at least one vent and/or at least one acoustic bridge. The determination module may then be configured to solve a system of coupled differential equations representing:

- the geometric definition and characteristics of the loudspeaker;

the dimensions of each box; and the characteristics of at least one vent and/or at least one acoustic bridge.

In a fifth example, the loudspeaker is integrated into a vehicle door. The determination module may then be configured to solve a system of coupled differential equations representing:

the geometric definition and characteristics of the loudspeaker;

the characteristics of the door panel;

the dimensions of the different volumes of the door: the volume of the box incorporating the loudspeaker and the peripheral volume formed between a front face of said box and the door panel; and the characteristics of the acoustic bridges between these volumes of the door, the acoustic bridges being made up of at least one sealing sheet and optional acoustic short-circuits.

In addition, the determination module preferably receives measurements of loudspeaker operating parameters, so that the system of coupled differential equations of the determination module also integrates the evolution of the loudspeaker parameters over time. Indeed, the parameters of the loudspeaker are likely to evolve during the time of use of the loudspeaker. For example, the impedance increases with the heating of the coil, as does the flexibility of the suspensions. In order to take this evolution into account, the device includes, for example, a negative feedback loop with sampling of voltage and current information at the loudspeaker, and the system of coupled differential equations may be solved in real time by taking this information into account so as to improve the accuracy of the adaptive control signal generated.

Although the adaptive control signal is custom and digitally designed, digital and/or analog processing may be performed in the processing line. Similarly, the input signal may undergo pre-processing operations before providing the non-adaptive control signal.

According to one embodiment, the processing line comprises a low-pass filter and an input signal transmission line comprises a high-pass filter. In other words, the input signal can be separated into two frequency components: the high frequencies, which are not modified, and the low frequencies which are modified by the device.

This embodiment stems from an observation that it is the low frequencies that undergo the most distortion. Thus, concentrating the processing on the low frequencies helps to reduce the processing time and the memory used because the processing of high frequency signals requires a much larger sampling rate and processing time.

Preferably, the processing device comprises two input signal transmission lines delivering two non-adaptive control signals:

a first transmission line comprising the high-pass filter; and a second transmission line comprising a low-pass filter.

This embodiment also makes it possible to transmit an unprocessed part at low frequency.

The distribution of the input signal between the different lines may be modulated as needed. To do this, the processing line and the at least one transmission line preferably include a weighting device making it possible to control the signal fraction addressed.

Furthermore, although the transmission lines allow the user to increase the sound volume beyond the limiting conditions imposed by the determination module in order to limit the distortions of the loudspeaker, the increase in volume by the user may drive the loudspeaker into an operating zone that may degrade it.

To protect the loudspeaker, the at least one transmission line and/or said processing line comprise a compressor and/or limiter configured to restrict the control signal if it exceeds a loudspeaker degradation threshold.

In addition, a compressor and/or limiter may also be placed on the processing line to filter out the unrealistic solutions on which said determination module may converge.

Furthermore, there are several possible implementations of the processing device in which the voltage or current of the loudspeaker may be controlled without modifying the subject matter of the invention. Preferably, the voltage of the estimation module is controlled to estimate the expected movements. Thus, when the output signal corresponds to a current signal, the estimation module is connected to the voltage of the input signal while the at least one transmission line is connected to a modeling of the current flowing through the coil, the determination module being configured to determine a current-adaptive control signal.

The estimation of the current flowing through the coil is based on the linear modeling of the loudspeaker and on the knowledge of the input voltage.

In a particular embodiment, the input signal and/or the output signal is an analog signal. Alternatively, the input signal and/or the output signal is a digital signal.

According to a second aspect, the invention also relates to an audio system incorporating a processing device according to the first aspect of the invention, generating an output signal from an input signal, and a loudspeaker connected to the output signal through an amplifier.

According to a third aspect, the invention relates to the processing of voltage information at the loudspeaker terminals and current information flowing through the coil. This makes it possible to integrate into the loudspeaker processing device the evolution of its electrical and/or mechanical characteristics during operation.

According to a fourth aspect, the invention relates to a loudspeaker incorporating an audio system according to the second aspect of the invention. The acoustic enclosure may comprise at least one vent and/or at least one radiator.

According to a fifth aspect, the invention relates to an acoustic resonator comprising at least two boxes communicating through at least one vent and/or at least one acoustic bridge, said resonator incorporating an audio system according to the second aspect of the invention.

According to a sixth aspect, the invention relates to a vehicle door equipped for sound incorporating an audio system according to the second aspect of the invention.

BRIEF DESCRIPTION OF THE FIGURES

Other advantages and characteristics of the invention will appear upon reading the following description, given by way of illustrative and non-limiting example with reference to the following appended figures.

FIG. 1 is a schematic representation of an audio system incorporating a prior art processing device;

FIG. 2 is a schematic representation of an audio system incorporating a processing device according to a first embodiment of the invention;

FIG. 3 is a schematic representation of an audio system incorporating a processing device according to a second embodiment of the invention;

FIG. 4 is a schematic representation of an audio system incorporating a processing device according to a third embodiment of the invention;

FIG. 5 is a schematic representation of an audio system incorporating a processing device according to a fourth embodiment of the invention;

FIG. 6 is a schematic representation of an audio system incorporating a processing device according to a fifth embodiment of the invention;

FIG. 7 is a schematic representation of an audio system incorporating a processing device according to a sixth embodiment of the invention;

FIG. 8 is a schematic representation of the operations performed by the module for taking into account the parameters of the loudspeaker in real time according to the sixth embodiment of the invention;

FIG. 9 is a schematic representation of an acoustic enclosure having a closed box including a loudspeaker according to an embodiment of the invention;

FIG. 10 is a schematic representation of an acoustic enclosure comprising a vent and including a loudspeaker according to an embodiment of the invention;

FIG. 11 is a schematic representation of an acoustic enclosure comprising a radiator and including a loudspeaker according to an embodiment of the invention;

FIG. 12 is a schematic representation of an acoustic resonator consisting of several boxes communicating through vents and/or acoustic bridges and including a loudspeaker according to an embodiment of the invention;

FIG. 13 is a schematic representation of a vehicle door including a loudspeaker; and FIG. 14 shows comparative evolution curves of the loudspeaker membrane movements of FIG. 1 in the presence or absence of the processing device of the invention.

POSSIBLE WAYS OF IMPLEMENTING THE INVENTION

Throughout the following description, in the absence of additional details, a signal may correspond to an analog or to a digital signal. Thus, one particular example specifies an analog input signal.

As illustrated in FIG. 2, the invention relates to a processing device 30*a* in which an input signal Si is distributed between two separate lines: a transmission line L1 and a processing line Lt. The processing line Lt comprises a module 31 for estimating the expected movements Da of the membrane of a loudspeaker 13 as a function of the input signal Si, as well as a module 32 for determining the adaptive control signal CmdA to be transmitted to the loudspeaker. loudspeaker 13 in order to best approximate the expected movements Da while taking into account the nonlinearities of the loudspeaker 13.

Thus, the processing line Lt makes it possible to obtain an adaptive control signal CmdA while the transmission line L1 makes it possible to obtain a non-adaptive control signal Cmd1. These two control signals Cmd1 and CmdA are associated with an adder 14 so as to obtain the output signal So. Conventionally, this output signal So is designed to feed the loudspeaker 13, for example through an amplifier 18.

Preferably, in order to limit the computational requirements of the adaptive control signal CmdA, a low-pass filter 16 is applied to the processing line Lt so that only the low frequencies of the input signal Si are processed by the processing line Lt. In this embodiment, the transmission line L1 comprises a high-pass filter 15 to transmit only the high frequencies without processing. Thus, in the example of FIG. 2, the output signal So consists of the high end of the frequency spectrum of the input signal Si, which does not include any processing, and of the low end of the frequency spectrum, entirely created by the determination module 32 to limit the nonlinearity defects of the loudspeaker 13 in the low frequencies.

Alternatively, as illustrated in FIG. 3, part of the low frequencies may also be transmitted by a second transmission line L2. Thus, the second transmission line L2 delivers a non-adaptive control signal Cmd2 flowing through a low-pass filter 17. Preferably, the different transmission lines L1-L2 and processing lines Lt include weighers α, β or γ of the input signal Si. For example, each of these weightings α, β or γ may be between 0 and 1.

As illustrated in FIG. 3, the weigher γ as well as the low-pass filter 16 of the processing line Lt may be placed before the module 31 for estimating the expected movements Da. As a variant, as illustrated in FIG. 4, it is possible to estimate the expected movements Da before applying the weighting γ and the low-pass filter 16 of the processing line Lt.

Furthermore, at least one transmission line L1-L2 may integrate a compressor and/or limiter 21 so as to restrict the corresponding control signal if it exceeds a loudspeaker degradation threshold value. Similarly, the processing line Lt may also integrate a compressor and/or limiter 11 so as to limit the movements to realistic values, as illustrated in FIG. 4.

In addition, the determination module 32 may optionally lead to the delivery of electrical signals exceeding a degradation threshold value of the loudspeaker 13 and a compressor and/or limiter 10 may be arranged to restrict the electrical signal coming from the determination module 32.

In FIGS. 3 and 4, the transmission line L2 as well as the processing line Lt have low-pass filters 16 and 17 and compressors and/or limiters 11 and 21. To limit the number of components, it is possible to pool the low-pass filters 16 and 17 into a low-pass filter 17' as well as the compressors and/or limiters 11 and 21 into a compressor and/or limiter 21'. Thus, after the low-pass filter 17' and the compressor and/or limiter 21' of FIG. 5, the processing device 30*d* comprises a transmission line L2' incorporating only the weigher adjusting the gain β and, in parallel with this transmission line L2', the processing line Lt. As previously described with reference to the other embodiments, this processing line Lt comprises: the weigher adjusting the gain γ, then the estimation module 31, another compressor and/or limiter 11, the determination module 32 as well as the limiter compressor 10 configured to electrically protect the loudspeaker 13.

Furthermore, the current or voltage of the loudspeaker 13 may be controlled, so that the processing devices 30*a*-30*e* of FIGS. 2 to 6 may be used to deliver an output signal So in current or in voltage.

Preferably, when it is expected to obtain a current output signal So, the estimation module 31 is nevertheless connected to the voltage information of the input signal Si. Indeed, such an estimation module 31 is simpler to perform on the basis of the voltage estimation.

Whatever the input of the estimation module 31, the expected movements Da are conventionally expressed in units of distance and the determination module 32 may just as easily be configured to supply an adaptive control signal CmdA in current or in voltage.

In the example of FIG. 6, the input signal Si injected is a voltage Si(t) for the processing line Lt and a current Si(c) for the two transmission lines L1 and L2. The determination module 32 is configured to supply an adaptive control signal CmdA(c) in current. To do this, the signal Si(t) may be taken directly from the input signal and the signal Si(c) may come from modeling and be calculated by the estimation module of the expected current 34.

FIG. 7 represents the taking into account in real time of the modifications of the electrical and/or mechanical parameters of the loudspeaker 13 during operation. To do this, the instantaneous values of voltage Uhp at the loudspeaker terminals and of current Ihp flowing through the coil are sent to the module 35 for adjusting the electrical and/or mechanical parameters of the loudspeaker. These are manipulated by the determination block 32 of adaptive signal control CmdA (c).

Obviously, it is possible to combine these different embodiments according to the needs of the application. For example, it is possible to combine the embodiments of FIGS. 5 and 6, i.e., by pooling the two low-pass filters 16 and 17 as well as the compressor and/or limiter 11 and 21 of FIG. 6, as achieved in FIG. 5, while using an estimation module 31 taking into account the voltage of the input signal Si(t) while the transmission lines L1-L2' take into account a modeling of the current flowing through the coil Si(c). Indeed, the transformation carried out in the estimation module 31 makes it possible to dispense with the type of unit used for the processing line Lt.

Similarly, in FIGS. 2 to 6, it is possible to integrate the module 35 for adjusting the electrical and/or mechanical parameters of the loudspeaker 13 between the loudspeaker 13 and the module 32 for determining the adaptive control signals CmdA, CmdA(c), as shown in FIG. 7.

Whatever the topology of the processing device 30*a*-30*f*, the determination module is configured to solve a system of coupled differential equations representing the nonlinearities of the loudspeaker 13 and the characteristics of the loudspeaker 13 environment.

FIG. 8 details the processing principle by the module 35 of the instantaneous voltage Uhp and current Ihp values at the loudspeaker 13. In practice, the instantaneous voltage Uhp and current Ihp values are recorded for a given observation period. Preferably, the number of points recorded is equal to a power of 2, typically $2^{11}$=2048 points. A temporal weighting, typically a Hanning weighting, may be applied.

The module 35 then performs a first step 100 of calculating the frequency spectrum of the instantaneous values of voltage Uhp and current Ihp. In practice, the algorithm known as "fast Fourier transform" may be used to calculate these spectra. For example, for a loudspeaker parameter update every 15 seconds, the "fast Fourier transform" algorithm may be configured with a sampling frequency of 44100 Hz and a capture of 2048 points. Thus, 323 pairs of spectra of voltage Uhp and current Ihp are obtained.

Generally, the spectra obtained include noise. To solve this problem, the second step 101 is a statistical exploitation of the spectra obtained, aiming in particular to eliminate the unusable spectra and to eliminate the noise by averaging over several measurements. This exploitation may, for example, be based on the analysis of the histogram of the spectra.

Then, step 102 carries out the calculation of the dynamic impedance, defined from the ratio of the spectra of the voltage Uhp and the current Ihp.

From the dynamic electrical impedance curve, it is possible:

to analyze the modulus thereof in step 103, and to analyze the phase thereof in step 104.

Calculating the dynamic continuous resistance Re in step 105 is carried out from the modulus of the dynamic electrical impedance curve.

The dynamic resonance frequency fs is calculated in step 106 from the phase of the dynamic electrical impedance curve, then the dynamic mechanical compliance Cms(x) of the suspensions of the loudspeaker 13 is estimated from the dynamic resonance frequency fs in step 107.

The value of the loudspeaker continuous dynamic resistance Re corresponds to the limit of the impedance modulus for frequencies tending towards zero and the value of the dynamic resonance frequency fs of the loudspeaker corresponds to the first non-zero frequency cancellation of the phase according to the increasing frequencies.

The dynamic mechanical compliance Cms(x) of the suspensions is estimated from the following relationship:

$$Cms(x)/Cms0(x)=h[(fs0/fs)^2] \quad \text{[Math 1]}$$

wherein:

fs0 is the nominal resonance frequency of the loudspeaker in its environment;

fs is the dynamic resonance frequency of the loudspeaker in its environment;

Cms0(x) is the nominal mechanical compliance of the loudspeaker suspensions;

Cms(x) is the dynamic mechanical compliance of the loudspeaker suspensions;

h is a function linking (Cms(x)/(Cms0(x)) and $(fs0/fs)^2$. This function is determined experimentally. In particular, h is the "identity" function in the case of a loudspeaker in the open air.

Thus, the module 35 for adjusting the electrical and/or acoustic parameters makes it possible to estimate the variations, during the operation of the loudspeaker 13, of the two parameters Re and Cms(x) manipulated by the module 32 for determining the adaptive control signals CmdA, CmdA (c).

FIGS. 9 to 13 illustrate concrete examples of the environment of a loudspeaker 13 positioned respectively:

in a closed acoustic enclosure, in an acoustic enclosure with a vent, in an acoustic enclosure with a radiator, in an acoustic resonator consisting of boxes in series connected by vents and/or acoustic bridges, and in a car door.

In general, and in each of these examples, the vibrating parts of the assembly consisting of the loudspeaker and its acoustic load are identified.

Within the meaning of the invention, the vibrating parts designate all the parts of the loudspeaker and its environment whose vibrations are, directly or indirectly, linked to the displacement of the membrane.

The vibrating parts are respectively:

for FIG. 9: the membrane of the loudspeaker 13, for FIG. 10: the membrane of the loudspeaker 13 and the air in the vent 90, for FIG. 11: the membrane of the loudspeaker 13 and the membrane of the radiator 91, for FIG. 12: the membrane of the loudspeaker 13 and the air in each of the vents and/or acoustic bridges $\mathbf{93}_1$-$\mathbf{93}_{(p\text{-}1)}$, and for FIG. 13: the loudspeaker membrane 13, the air at the acoustic short-circuit 84, the sealing sheet 83 and the door panel 85.

These vibrating parts form a partition, in the mathematical sense, of all the vibrating parts of the loudspeaker and its environment, due to a coupling, in the mechanical and/or acoustic sense, with the loudspeaker membrane.

The movements, assumed to be uniform, of each of these vibrating parts, to which the current flowing through the voice coil of loudspeaker 13 is added, constitute the variables of the system of coupled differential equations.

Thus, if n vibrating parts, other than the loudspeaker membrane 13, are identified, the number of coupled differential equations is equal to (n+2).

The general formulation of the system of coupled differential equations is then the following:

[Math 2]

$$(S)\begin{cases} u(t) = \mathrm{Re}\times i(t) + \dfrac{\partial}{\partial t}(Le(x,t)\times i(t)) + BL(x)\times\dfrac{\partial}{\partial t}(x(t)) & (1)\\ BL(x)\times i(t) = Mms\times\dfrac{\partial_x^2(t)}{\partial t^2} + \mathrm{Rms}\times\dfrac{\partial x(t)}{\partial t} + \dfrac{1}{Cms(x)}\times & (2)\\ \quad x(t)\dfrac{1}{2}\times\dfrac{\partial_{Le}(x)}{\partial x}\times i^2(t) + f(x(t), x1(t), \ \dots\ xn(t)) & \\ g_1(x(t), x1(t), \ \dots\ xn(t)) = 0 & (3-1)\\ g_2(x(t), x1(t), \ \dots\ xn(t)) = 0 & (3-2)\\ \dots & \dots\\ g_n(x(t), x1(t), \ \dots\ xn(t)) = 0 & (3-n) \end{cases}$$

In this formulation, equation (1) is the electrical differential equation of the loudspeaker 13, describing the current i(t) flowing through its coil, and equation (2) is the mechanical differential equation of the loudspeaker 13, describing the displacement x(t) of its membrane. The coupled differential equations (3-1) to (3-n) link the displacement of the membrane to the movements $x_1(t)$-$x_n(t)$ of the n other vibrating parts, the functions $f$, $g_1$-$g_n$ establishing the mechanical or acoustic links between the variables x(t), $x_1(t)$-$x_n(t)$.

FIG. 9 illustrates a concrete example of the environment of a loudspeaker 13 positioned in a closed acoustic enclosure.

In this case, the variables of the system of coupled differential equations are: the current flowing through the coil of the loudspeaker 13 and its membrane displacement. The system is then written:

[Math 3]

$$(Sa)\begin{cases} u(t) = \mathrm{Re}\cdot i(t) + \dfrac{\partial}{\partial t}(Le(x,t)\cdot i(t)) + BL(x)\cdot\dfrac{\partial}{\partial t}(x(t)) & (1a)\\ BL(x)\cdot i(t) = Mms\cdot\dfrac{\partial_x^2(t)}{\partial t^2} + \mathrm{Rms}\cdot\dfrac{\partial x(t)}{\partial t} + \dfrac{1}{Cms(x)}\cdot x(t) + & (2a)\\ \quad P0\cdot Sd\left[1-\left(\dfrac{V1}{V1+Sd\cdot x(t)}\right)^{\gamma}\right] + \dfrac{1}{2}\cdot\dfrac{\partial_{Le}(x)}{\partial x}\cdot i(t)^2 & \end{cases}$$

In these coupled differential equations:

x(t) corresponds to the displacement of the coil of the loudspeaker 13;

V1 is the volume of box 89;

Sd is the radiating surface of the membrane of the loudspeaker 13;

P0 is the atmospheric static pressure; and

γ=1.4 is the ratio of the specific heats of air at constant pressure and volume.

FIG. 10 illustrates a concrete example of the environment of a loudspeaker 13 positioned in an acoustic enclosure comprising a vent 90.

In this case, the variables of the system of coupled differential equations are: the current flowing through the coil of the loudspeaker 13, its membrane displacement and the air displacement in the vent 90. The system is then written:

[Math 4]

$$(Sb)\begin{cases} u(t) = \mathrm{Re}\cdot i(t) + \dfrac{\partial}{\partial t}(Le(x,t)\cdot i(t)) + BL(x)\cdot\dfrac{\partial}{\partial t}(x(t)) & (1b)\\ BL(x)\cdot i(t) = Mms\cdot\dfrac{\partial_x^2(t)}{\partial t^2} + \mathrm{Rms}\cdot\dfrac{\partial x(t)}{\partial t} + \dfrac{1}{Cms(x)}\cdot x(t) + & (2b)\\ \quad P0\cdot Sd\left[1-\left(\dfrac{V1}{V1+Sd\cdot x(t)}\right)^{\gamma}\right] + \dfrac{1}{2}\cdot\dfrac{\partial_{Le}(x)}{\partial x}\cdot i(t)^2 & \\ 0 = M1\cdot\dfrac{\partial_x^2 1(t)}{\partial t^2} + P0\cdot S1\left[1-\left(\dfrac{V1}{V1+Sd\cdot x(t)+S1\cdot x1(t)}\right)^{\gamma}\right] & (3b-1) \end{cases}$$

In these equations:

x(t) corresponds to the displacement of the coil of the loudspeaker 13;

x1(t) corresponds to the air displacement in the vent 90;

V1 is the volume of box 89;

Sd is the radiating surface of the membrane of the loudspeaker 13;

S1 is the radiating surface of vent 90;

P0 is the atmospheric static pressure;

M1 is homogeneous with a mechanical mass; and

γ=1.4 is the ratio of the specific heats of air at constant pressure and volume.

FIG. 11 illustrates a concrete example of the environment of a loudspeaker 13 positioned in an acoustic enclosure comprising a radiator 91.

In this case, the variables of the system of coupled differential equations are: the current flowing through the coil of the loudspeaker 13, its membrane displacement and the displacement of the radiator 91. The system is then written:

[Math 5]

$$(Sb)\begin{cases} u(t) = \mathrm{Re}\cdot i(t) + \dfrac{\partial}{\partial t}(Le(x,t)\cdot i(t)) + BL(x)\cdot\dfrac{\partial}{\partial t}(x(t)) & (1c)\\ BL(x)\cdot i(t) = Mms\cdot\dfrac{\partial_x^2(t)}{\partial t^2} + \mathrm{Rms}\cdot\dfrac{\partial x(t)}{\partial t} + \dfrac{1}{Cms(x)}\cdot x(t) + & (2c)\\ \quad P0\cdot Sd\left[1-\left(\dfrac{V1}{V1+Sd\cdot x(t)}\right)^{\gamma}\right] + \dfrac{1}{2}\cdot\dfrac{\partial_{Le}(x)}{\partial x}\cdot i(t)^2 & \\ 0 = M1\cdot\dfrac{\partial_x^2 1(t)}{\partial t^2} + R1\cdot\dfrac{\partial_x 1(t)}{\partial t} + \dfrac{1}{C1}\cdot x1(t) + & (3c-1)\\ \quad P0\cdot S1\left[1-\left(\dfrac{V1}{V1+Sd\cdot x(t)+S1\cdot x1(t)}\right)^{\gamma}\right] & \end{cases}$$

In these equations:

x(t) corresponds to the displacement of the coil of the loudspeaker 13;

x1(t) corresponds to the displacement of the radiator 91;

V1 is the volume of box 89;

Sd is the radiating surface of the membrane of the loudspeaker 13;

S1 is the radiating surface of the radiator 91;

P0 is the atmospheric static pressure;

M1 is homogeneous with a mechanical mass;

R1 is homogeneous with a mechanical resistance;

C1 is homogeneous with a mechanical compliance; and

γ=1.4 is the ratio of the specific heats of air at constant pressure and volume.

FIG. 12 illustrates a concrete example of the environment of a loudspeaker 13 positioned in an acoustic resonator consisting of p boxes $\mathbf{93}_1$-$\mathbf{93}_{(p-1)}$ in series communicating through (p-1) vents and/or acoustic bridges.

In this case, the variables of the system of coupled differential equations are: the current flowing through the coil of the loudspeaker 13, its membrane displacement and the air displacement in the p-1 vents and/or acoustic bridges. The system is then written:

[Math 6]

$$
(Sd)\begin{cases}
u(t) = \mathrm{Re}\cdot i(t) + \dfrac{\partial}{\partial t}(Le(x,t)\cdot i(t)) + BL(x)\cdot\dfrac{\partial}{\partial t}(x(t)) & (1d)\\
BL(x)\cdot i(t) = Mms\cdot\dfrac{\partial_x^2(t)}{\partial t^2} + \mathrm{Rms}\cdot\dfrac{\partial x(t)}{\partial t} + \dfrac{1}{Cms(x)}\cdot & (2d)\\
x(t) + P0\cdot Sd\left[1-\left(\dfrac{V1}{V1+Sd\cdot x(t)-S1\cdot x1(t)}\right)^{\gamma}\right] + & \\
\dfrac{1}{2}\cdot\dfrac{\partial_{Le}(x)}{\partial x}\cdot i(t)^2 & \\
0 = M1\cdot\dfrac{\partial_x^2 1(t)}{\partial t^2} + R1\cdot\dfrac{\partial_x 1(t)}{\partial t} + \dfrac{1}{C1}x1(t) + & (3d-1)\\
P0\cdot S1\left[1-\left(\dfrac{V1}{V1+S1\cdot x(t)-S1\cdot x1(t)}\right)^{\gamma}\right] + & \\
P0\cdot S1\left[1-\left(\dfrac{V2}{V2+S2\cdot x(t)-S2\cdot x2(t)}\right)^{\gamma}\right] & \\
0 = M2\cdot\dfrac{\partial_x^2 2(t)}{\partial t^2} + R2\cdot\dfrac{\partial_x 2(t)}{\partial t} + \dfrac{1}{C2}x2(t) + & (3d-2)\\
P0\cdot S2\left[1-\left(\dfrac{V2}{V2+S2\cdot x2(t)-S1\cdot x1(t)}\right)^{\gamma}\right] + & \\
P0\cdot S2\left[1-\left(\dfrac{V3}{V3+S2\cdot x2(t)-S3\cdot x3(t)}\right)^{\gamma}\right] & \\
\dots & \\
0 = M_{p-2}\cdot\dfrac{\partial_{x_{p-2}}^2(t)}{\partial t^2} + R_{p-2}\cdot\dfrac{\partial_{x_{p-2}}(t)}{\partial t} + \dfrac{1}{C_{p-2}}x_{p-2}(t) + & (3d-(p-2))\\
P0\cdot S_{p-2}\left[1-\left(\dfrac{V_{p-2}}{V_{p-3}+S_{p-2}\cdot x_{p-2}(t)-S_{p-3}\cdot x_{p-2}(t)}\right)^{\gamma}\right] + & \\
P0\cdot S_{p-2}\left[1-\left(\dfrac{V_{p-1}}{V_{p-1}+S_{p-2}\cdot x_{p-2}(t)-S_{p-1}\cdot x_{p-1}(t)}\right)^{\gamma}\right] & \\
0 = M_{p-1}\cdot\dfrac{\partial_{x_{p-1}}^2(t)}{\partial t^2} + R_{p-1}\cdot\dfrac{\partial_{x_{p-1}}(t)}{\partial t} + \dfrac{1}{C_{p-1}}x_{p-1}(t) + & (3d-(p-1))\\
P0\cdot S_{p-1}\left[1-\left(\dfrac{V_{p-1}}{V_{p-3}+S_{p-2}\cdot x_{p-2}(t)-S_{p-3}\cdot x_{p-2}(t)}\right)^{\gamma}\right] + & \\
P0\cdot S_{p-1}\left[1-\left(\dfrac{V_p}{V_p+S_{p-1}\cdot x_{p-1}(t)}\right)^{\gamma}\right] &
\end{cases}
$$

In these equations:
- x(t) corresponds to the displacement of the coil of the loudspeaker 13;
- $x_1(t)$-$x_{p-1}(t)$ correspond to air movements in the vents and/or acoustic bridges $\mathbf{93}_1$-$\mathbf{93}_{(p-1)}$;
- $V_1$-$V_p$ are the volumes of boxes $\mathbf{92}_1$-$\mathbf{92}_{(p)}$;
- Sd is the radiating surface of the membrane of the loudspeaker 13;
- $S_1$-$S_{p-1}$ are the surfaces of the vents and/or acoustic bridges $\mathbf{93}_1$-$\mathbf{93}_{(p-1)}$;
- P0 is the atmospheric static pressure;
- $M_1$-$M_{p-1}$ are homogeneous with mechanical masses;
- $R_1$-$R_{p-1}$ are homogeneous with mechanical resistances;
- $C_1$-$C_{p-1}$ are homogeneous with mechanical compliances; and
- $\gamma$=1.4 is the ratio of the specific heats of the air at constant pressure and volume.

Finally, FIG. 13 illustrates a concrete example of the environment of a loudspeaker 13 positioned in a vehicle door.

A vehicle door is schematized, in a simplified manner, by a loudspeaker 13 mounted on a front face 81 of a box. This box is closed by a rear face 82, thus defining a volume 88. A door panel 85 is also fixed to the front face 81 of the box. To integrate the loudspeaker 13, a peripheral volume 86 is formed between the front face 81 of the box and the door panel 85.

These volumes 86, 88 are typically filled with air. In addition, these air volumes 88 and 86 are connected by acoustic bridges optionally comprising a clear acoustic short-circuit 84 and at least one sealing sheet 83 similar to a membrane. The loudspeaker 13 radiates in the compartment and may be covered with open-cell foam or a grille 87 to enhance door aesthetics. However, given the significant acoustic transparency of this foam or grille, this element 87 will not be taken into consideration in this diagram. The door panel 85 is acoustically similar to a membrane also radiating in the compartment.

In this case, the variables of the system of differential equations are: the current flowing through the coil of the loudspeaker 13, its membrane displacement, the air displacement at the acoustic short-circuit 84, the displacement of the sealing sheet 83 and the displacement of the door panel 85. The system is then written:

[Math 7]

$$
(Se)\begin{cases}
u(t) = \mathrm{Re}\cdot i(t) + \dfrac{\partial}{\partial t}(Le(x,t)\cdot i(t)) + BL(x)\cdot\dfrac{\partial}{\partial t}(x(t)) & (1e)\\
BL(x)\cdot i(t) = Mms\cdot\dfrac{\partial_x^2(t)}{\partial t^2} + \mathrm{Rms}\cdot & (2e)\\
\dfrac{\partial x(t)}{\partial t} + \dfrac{1}{Cms(x)}\cdot x(t) + P0\cdot Sd & \\
\left[1-\left(\dfrac{V1}{V2+Sd\cdot x(t)+S1\cdot x2(t)+S3\cdot x3(t)}\right)^{\gamma}\right] + & \\
\dfrac{1}{2}\cdot\dfrac{\partial_{Le}(x)}{\partial x}\cdot i(t)^2 & \\
0 = M1\cdot\dfrac{\partial_x^2 1(t)}{\partial t^2} + & (3e-1)\\
P0\cdot S1\left[1-\left(\dfrac{V1}{V1+Sd\cdot x(t)+S1\cdot x1(t)+S2\cdot x2(t)}\right)^{\gamma}\right] + & \\
P0\cdot S1\left[1-\left(\dfrac{V2}{V2+S2\cdot x1(t)+S2\cdot x2(t)-S3\cdot x3(t)}\right)^{\gamma}\right] & \\
0 = M2\cdot\dfrac{\partial_x^2 2(t)}{\partial t^2} + R2\cdot\dfrac{\partial_x 2(t)}{\partial t} + \dfrac{1}{C2}x2(t) + & (3e-2)\\
P0\cdot S2\left[1-\left(\dfrac{V2}{V1+Sd\cdot x(t)+S1\cdot x1(t)+S2\cdot x2(t)}\right)^{\gamma}\right] + & \\
P0\cdot S2\left[1-\left(\dfrac{V2}{V2+S1\cdot x1(t)-S2\cdot x2(t)-S3\cdot x3(t)}\right)^{\gamma}\right] & \\
0 = M3\cdot\dfrac{\partial_x^2 3(t)}{\partial t^2} + R3\cdot\dfrac{\partial_x 3(t)}{\partial t} + \dfrac{1}{C3}x3(t) + & (3e-3)\\
P0\cdot S3\left[1-\left(\dfrac{V2}{V2+S3\cdot x3(t)+S2\cdot x2(t)-S1\cdot x1(t)}\right)^{\gamma}\right] &
\end{cases}
$$

In these equations:
- x(t) corresponds to the displacement of the coil of the loudspeaker 13;
- x1(t) is the air displacement at the acoustic short-circuit 84;
- x2(t) is the displacement of the sealing sheet 83;
- x3(t) is the displacement of the door panel 85;
- V1 is the volume of the box 88;
- V2 is device volume 86;
- Sd is the radiating surface of the membrane of the loudspeaker 13;
- S1 is the section of the acoustic short-circuit 84;
- S2 is the surface of the sealing sheet 83;

S3 is the radiating surface of door panel 85;

P0 is the atmospheric static pressure;

M1, M2, M3 are homogeneous with mechanical masses;

R2, R3 are homogeneous with mechanical resistances;

C2, C3 are homogeneous with mechanical compliances; and $\gamma$=1.4 is the ratio of the specific heats of the air at constant pressure and volume.

The parameters $M_1$-$M_{p-1}$, $R_1$-$R_{p-1}$, $C_1$-$C_{p-1}$ appearing in the systems of equations [Math 4] to [Math 7], and, therefore implicitly, in the functions $f$, $g_1$-$g_n$ of [Math 2], may, for example, be determined experimentally from electrical impedance measurements taken at the loudspeaker terminals at different frequencies, the number of which is greater than or equal to the number of parameters to be determined.

Typically, if M designates the number of parameters to be determined and if N designates the number of frequencies considered, with N≥M, the set P of parameters sought can be estimated by the least squares technique, by seeking to minimize the function $\sigma(P)$ defined as follows:

[Math 8]

$$\sigma(P)=\sum_{n=1}^{N}|Z_m(f_i)-Z_t(f_i,P)|^2$$

In this expression, $Z_m$ ($f_i$) designates the complex electrical impedance measured at frequency $f_i$, $Z_t$ ($f_i$,P) designates the theoretical complex electrical impedance at the frequency $f_i$ deduced from the electrical equation of the model with the set of parameters P, $|Z_m(f_i)-Z_t(f_i,P)|$ designates the modulus of the difference between the complex impedances $Z_m(f_i)$ and $Z_t(f_i,P)$, and $\sigma(P)$ designates the sum of the squares of these modules $|Z_m(f_i)-Z_t(f_i,P)|$ In order to optimize the efficiency of the determination, and, therefore, the convergence towards the desired set of parameters P, it is desirable to choose frequencies $f_1$-$f_N$ for which the moduli of the electrical impedance differences between the loudspeaker mounted in its environment and the loudspeaker in the open air are as large as possible.

In addition, the evolution as a function of time of the DC resistance Re and of the mechanical compliance of the loudspeaker suspensions Cms(x) may be estimated from the voltage Uhp and the current Ihp measured on the loudspeaker. Therefore, the device may comprise a current and voltage feedback loop transmitted to the loudspeaker 13 to transmit these values to the processing module 35, said module 35 delivering the values of Re and Cms(x) to the module 32 for determining the adaptive control signal CmdA.

Thus, this system of coupled differential equations makes it possible to faithfully model the behavior of the loudspeaker 13 in its real environment. Preferably, the determination module 32 receives measurements of operating parameters of the loudspeaker 13, so that the system of coupled differential equations of the determination module 32 also integrates the evolution of the parameters of the loudspeaker 13 over time.

To conclude, the invention makes it possible to obtain more efficient modeling than existing systems since the loudspeaker is modeled in its real environment. By way of example, FIG. 14 illustrates the evolution of the movements of the membrane of the loudspeaker 13 with the processing device Di and without the processing device Dsi of the invention for a sinusoidal sweep in voltage of amplitude 10 Vrms imposed on the analog input signal Si. As illustrated in FIG. 14, the distortions present without the processing device Dsi of the invention are practically all suppressed by the processing device 30*a*-30*f* of the invention.

In addition, the invention also makes it possible to improve the user's control over the entire audio system incorporating the processing device 30*a*-30*f* since the user can choose to continue to increase the volume without being restrained when the determination module 32 detects the threshold of appearance of the nonlinearities.

The invention claimed is:

1. A device for processing an input signal (Si), generating an output signal (So) designed to feed a loudspeaker, directly or indirectly, through an amplifier wherein said device includes a processing line (Lt) comprising:

a module for estimating the expected movements (Da) of the loudspeaker as a function of the input signal (Si); and a module for determining an adaptive control signal (CmdA) to be transmitted to the loudspeaker, i.e., a signal determined digitally from an expected displacement of the membrane; characterized in that the processing device further comprises:

at least one transmission line (L1, L2, L2') of the input signal (Si) delivering at least one non-adaptive control signal (Cmd1, Cmd2), i.e., a signal originating, directly or indirectly, from the input signal (Si); and an adder delivering the output signal (So) by summing the adaptive control signal (CmdA) and the at least one non-adaptive control signal (Cmd1, Cmd2), wherein the determination module is configured to solve a system of coupled differential equations aimed at determining the signal to be transmitted to the loudspeaker in order to obtain the expected displacement of the membrane, the system of coupled differential equations representing the loudspeaker, considered as a nonlinear transducer, and the environment of the loudspeaker.

2. The processing device according to claim 1, wherein the processing line (Lt) comprises a low-pass filter and a transmission line (L1) of the input signal (Si) comprises a high-pass filter.

* * * * *